May 9, 1933. F. UDVARY ET AL 1,908,085

GRAIN PLANTING AND SORTING MACHINE

Filed Nov. 17, 1931

Inventors:
Franz Udvary
and Karl Koller
by Karlenbauer
Atty.

Patented May 9, 1933

1,908,085

UNITED STATES PATENT OFFICE

FRANZ UDVARY AND KARL KOLLER, OF BUDAPEST, HUNGARY

GRAIN PLANTING AND SORTING MACHINE

Application filed November 17, 1931. Serial No. 575,573.

Our invention refers to improvements in grain planting and sorting machines, more especially of the kind described in the British patent to Udvary, No. 331,005, which discloses a machine for delivering a predetermined number of grains or seeds by means of a plurality of channel-shaped guiding devices, each having the form of an isolated trough-shaped ladle, the cross-section of which approximately corresponds to half the cross-section of a grain, and which pick up a number of grains from a body of grains in the planting or sorting wheel and arrange the picked up grains in a single row in such manner that the delivering (planting or sorting) member proper is merely supplied with the predetermined number of grains.

The channel-shaped ladles and guiding devices afore described have the form of a spiral of one or two convolutions, the radius of curvature of which gradually decreases from the free supply end to the planting end of the spiral. The channels are arranged for rotation about a horizontal axis and during this rotation the grains picked up by each channel will slide in the channel and, owing to its particular shape only the predetermined number of grains will reach the delivery member proper, while all the others will drop out and back into the planting wheel or other container.

Further experiments made with these and other picking up and guiding channels have now shown that the form of a spiral of one or two convolutions as disclosed in the British specification aforesaid is not adapted for use in grain planting or sorting machines, in which only a single grain shall be supplied to the delivering member proper, to be deposited on the soil or in the sorting receptacle.

Our experiments have shown that in the channel-shaped guides afore described the grains will frequently crowd together so that two or more grains will reach the delivering member proper.

We have now found that this can be avoided if the channel-shaped guides hitherto suggested are replaced by similar guides, the radius of which however changes abruptly, so that the guide is curved in consecutive sections, the first of which has a long radius, while a short adjoining section is curved according to a very short radius, the chord of its curve being substantially equal in length to the length of a single grain. This short section is then followed by a third section of long radius, which may be followed by a fourth section similar to the second one, i. e. being curved according to so short a radius that its chord is substantially equal in length to a single grain, etc.

Those sections of the new guide channel, which are curved according to long radii do not extend in one plane, but in different planes, the second section extending in a plane enclosing with the plane of the first section a small angle. Similarly if a third section of long radius is provided, this third section will also extend in a plane, which encloses with the plane of the second section a small angle, as will be described more fully hereinafter, with reference to the drawing affixed to this specification and forming part thereof, which illustrates the new pick up and guide channels as such by way of example, and also in their application to the planting wheel of a single grain planting machine, all the showings being of a purely diagrammatic kind.

In the drawing,

Fig. 1 is a mere diagram of a picking up and guiding channel according to this invention, while

Fig. 5 is a cross-section on the line V—V in

Figure 4:
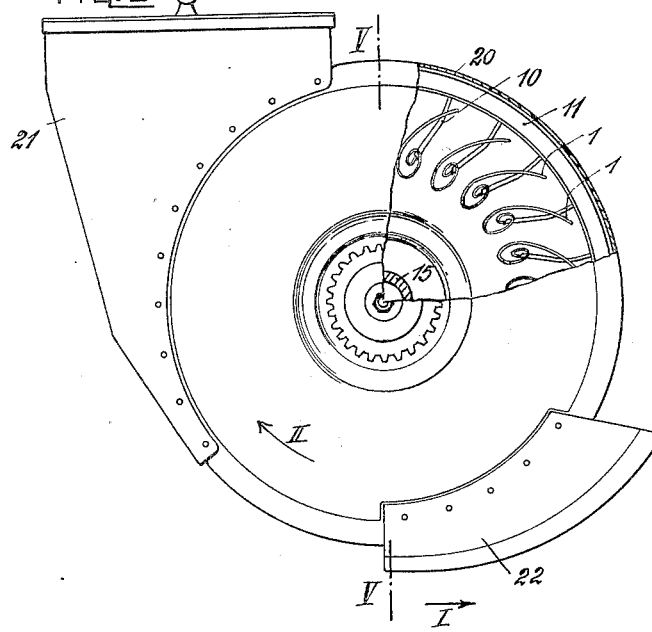
Fig. 4 is a side elevation, partly in section.

Fig. 4 of a planting wheel with channels according to the present invention inserted therein.

Figure 1:
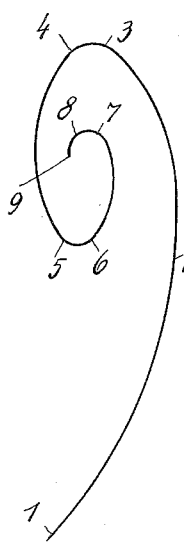

Referring to the drawing and first to Fig. 1, 1 is the picking end of the channel and 2 is the first and longest section which is curved according to a comparatively long radius. 3—4 is the second section which directly adjoins the first section. As shown in the drawing, the radius abruptly decreases at 3, the length of the section 3—4 being so chosen that the length of its chord is substantially equal to the length of a single grain. At 4 the radius increases again abruptly, the third section thus extending from 4 to 5 in the form of a flat spiral. At 5 the radius again decreases abruptly, so that between the points 5 and 6 a fourth section will form, whose chord is approximately equal to the length of a single grain. At the point 6 the member is once more formed with a long radius up to the point 7, where the radius again decreases abruptly, so that here a fifth section is formed, the chord of which is approximately equal in length to a single grain. The short sixth section 8—9 leads directly to the delivering member proper.

If a guide channel, such as here described and shown in Fig. 1 is made to rotate about a horizontal axis, the grains picked up by its free end 1 will slide in a row on the first section 2 until they reach the second short section 3—4, when most of the grains will drop off, due to the fact that the first grain reaching the first short section 3—4 will be retained therein for some time owing to its point meeting the comparatively steep wall of the third section 4—5. Due to this braking action exerted on the first grain the sliding movement of the following grains will be retarded of a sudden, causing them to drop out and fall back into the receptacle. Those grains (say two or three) which have remained over in the channel will, in the course of the further rotation, slide on through the third section 4—5 until the first grain is retarded again in the short section 5—6, whereby the other grains, being braked of a sudden, will drop off, so that only a single grain remains in the channel and in sliding along therein and having passed through the sections 6—7 and 7—8 will reach the inner end 9 leading into the delivering member proper.

A great number of tests have shown that scarcely, if ever, more than a single grain is left in the channel after having reached the fourth section 5—6, but if another grain should be left, it will be ejected with absolute certainty on the first grain reaching the third short section 7—8, so that the new picking up and guiding member in fact allows depositing in the soil or in the sorting receptacle only a single grain at a time.

Figure 2:
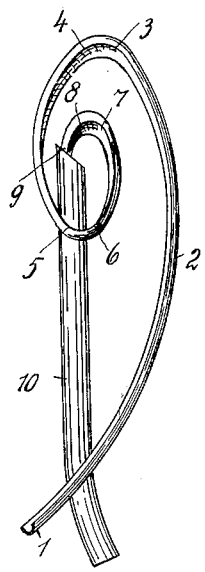
Figs. 2 and 3 are a front and a side elevation, respectively, of such a channel.
Figure 3:
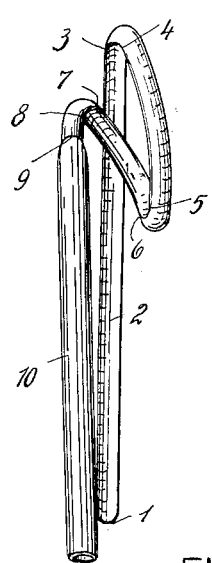

Figs. 2 and 3 in which the consecutive sections of the picking up and guiding channel are indicated in a similar manner, illustrate more clearly its particular configuration. The channel here shown has a cross-section somewhat a U and a V, one side wall being preferably a little higher than the other one. As can best be seen in Fig. 3, the sections 1, 3 and 5, curved according to comparatively large radii, are arranged in planes intersecting each other, the torsion of the consecutive parts of the channel being so chosen that they open alternately in one and the opposite direction.

The delivery member proper 10 is shown in the form of a small cylindrical tube in one end of which the inner end 9 of the channel is inserted.

Apart from the braking action exerted on the first of the rows of grains picked up by the channel, also the change of direction, to which the grains are subjected in passing from one section to the other, is instrumental in causing them to drop out. Owing to the different sections being inclined in different directions, the grains will drop out alternately on one and the other side.

In order that the grains can readily slide in the channels the wall surface of the channels is preferably highly polished. As one of the side walls of the channel is preferably made somewhat higher than the other, those grains which on being picked up have assumed a transverse position, are forced to fall into the channel.

Figure 5:
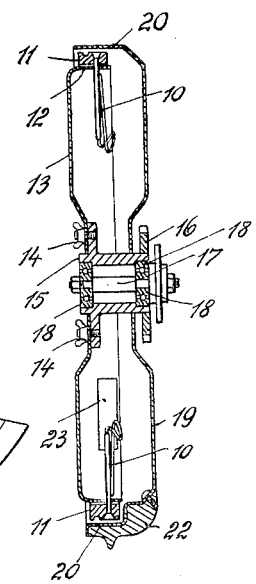

In the planting wheel illustrated in Figs. 4 and 5 the guide channels and delivering members above described are illustrated as being arranged therein in a manner well known per se. The tubular delivering members 10 are shown to be fixed substantially in radial position in a ring 11, which is secured in its turn on the inwardly projecting flange 12 of a disc 13, which is mounted with the aid of screws 14 on the hub 15. 16 is a sprocket wheel mounted on the opposite end of the hub 15 and a chain (not shown) gearing with this sprocket wheel and driven by suitable driving mechanism (not shown) will cause the hub 15, disc 13 and ring 11 to rotate about the fixed axle 17, ball bearings 18 being inserted between this axle and the hub 15.

A stationary disc 19 mounted on the hub is formed with a flange 20 extending around the ring 11. To the disc 19 is secured the grain reservoir 21 and, at the bottom, the shoe 22. The grain reservoir 21 is connected with the space enclosed between the discs 13 and 19 by an opening 23 (Fig. 5). In the flange 20 a slit (not shown) is formed near the front end of the shoe 22, through which the grains falling through the tubular members 10 can pass into the soil.

In the operation of this machine the grain reservoir 21 is filled with grains and the machine is now placed with its shoe 22 on the soil and moved in the direction of the arrow I in Fig. 4. The sprocket wheel 16 driven by a chain from one of the car wheels or the like causes the disc 13 to rotate in the direction of the arrow II in Fig. 4 and the picking up and guiding channels 1 to 9 now rotate about their common axis, each picking up a number of grains from the body of grains filling the bottom part of the wheel. While each guide channel now rotates through the first full circle, the grains will pass through the first section 1—3, the second section 3—4, where most of the grains will drop off, and the third section 4—5. At the beginning of the second circle of rotation the grains still remaining over will have reached the fourth section 5—6, where the last but one grain will also fall off, so that only the first grain will be left in the channel and after having passed the fifth and sixth sections 6—7 and 7—8, respectively, will enter the tubular delivery member 10 and will drop through it and through the slot provided in the bottom part of the wheel and in the shoe 22 to be deposited in the soil.

In single grain sorting machines the guide members according to the present invention may be mounted in a similar manner.

We wish it to be understood that we do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

We claim:—

1. Picking up and guiding member for single grain planting and sorting machines comprising a channel in the form of a spiral curved alternately according to comparatively long and short radii, the chord of the section of the channel, which is curved according to a short radius, having approximately the length of a single grain.

2. Picking up and guiding member for single grain planting and sorting machines comprising a channel in the form of a spiral of more than one convolution curved in sections, the first and longest section being curved according to a comparatively long radius, the adjoining section being curved according to a considerably shorter radius, and being of such length that its chord approximately equals in length a single grain, the third section being curved according to a comparatively long radius, the fourth section being curved along a comparatively short radius and having a length such that its chord substantially equals a single grain in length.

3. Picking up and guiding member for single grain planting and sorting machines comprising a channel in the form of a spiral, the radii of curvature of which change abruptly, and the sections of the channel curved according to comparatively long radii, being inclined to each other in the transverse direction in such manner as to open in different directions.

In testimony whereof we affix our signatures.

FRANZ UDVARY.
KARL KOLLER.